(12) United States Patent
Bedard et al.

(10) Patent No.: US 8,580,154 B2
(45) Date of Patent: Nov. 12, 2013

(54) QUATERNARY AMMONIUM SALTS AS A CONVERSION COATING OR COATING ENHANCEMENT

(71) Applicants: Thomas C. Bedard, Ringwood, NJ (US); Thomas David Burleigh, Socorro, NM (US); Larry K. Hall, Easton, PA (US); Joseph Kimler, Yardville, NJ (US); Joseph W. Scheblein, Flemington, NJ (US); Michael Y. Chiang, Whitehouse Station, NJ (US)

(72) Inventors: Thomas C. Bedard, Ringwood, NJ (US); Thomas David Burleigh, Socorro, NM (US); Larry K. Hall, Easton, PA (US); Joseph Kimler, Yardville, NJ (US); Joseph W. Scheblein, Flemington, NJ (US); Michael Y. Chiang, Whitehouse Station, NJ (US)

(73) Assignee: Lonza, Inc., Allendale, NJ (US)

( * ) Notice: Subject to any disclaimer, the term of this patent is extended or adjusted under 35 U.S.C. 154(b) by 0 days.

(21) Appl. No.: 13/726,495

(22) Filed: Dec. 24, 2012

(65) Prior Publication Data

US 2013/0126047 A1  May 23, 2013

Related U.S. Application Data

(63) Continuation of application No. 12/952,690, filed on Nov. 23, 2010, now Pat. No. 8,337,640, which is a continuation of application No. 11/299,323, filed on Dec. 9, 2005, now abandoned.

(60) Provisional application No. 60/634,793, filed on Dec. 9, 2004.

(51) Int. Cl.
| | |
|---|---|
| *C09K 15/16* | (2006.01) |
| *C09K 15/20* | (2006.01) |
| *C09K 15/30* | (2006.01) |
| *C23F 11/14* | (2006.01) |
| *C09K 3/00* | (2006.01) |
| *C23C 8/40* | (2006.01) |
| *C23C 22/00* | (2006.01) |
| *B05D 3/10* | (2006.01) |
| *B05D 7/14* | (2006.01) |

(52) U.S. Cl.
USPC ........ 252/390; 252/389.1; 252/391; 252/392; 252/394; 252/401; 252/403; 252/405; 422/7; 422/12; 422/28; 507/939; 106/14.15; 106/14.31; 148/327; 148/328; 148/333; 148/419; 148/419.2

(58) Field of Classification Search
USPC .......................................... 106/14.15, 14.31
See application file for complete search history.

(56) References Cited

U.S. PATENT DOCUMENTS

| | | | |
|---|---|---|---|
| 2,759,975 A | 8/1956 | Chiddix et al. | |
| 3,121,091 A | 2/1964 | Green | |
| 3,365,313 A | 1/1968 | Roberts et al. | |
| 3,413,160 A | 11/1968 | Teumac | |
| 4,226,624 A | 10/1980 | Ohr et al. | |
| 4,243,417 A * | 1/1981 | Grourke et al. | 106/14.13 |
| RE30,714 E | 8/1981 | Harriman et al. | |
| RE30,796 E | 11/1981 | Lesinski | |
| 4,505,748 A | 3/1985 | Baxter | |
| 4,637,899 A | 1/1987 | Kennedy, Jr. | |
| 4,693,423 A * | 9/1987 | Roe et al. | 239/332 |
| 4,792,417 A * | 12/1988 | Mizia et al. | 252/392 |
| 4,859,418 A | 8/1989 | Ohlendorf et al. | |
| 5,217,946 A | 6/1993 | Dolhert | |
| 5,312,491 A * | 5/1994 | Binter | 148/240 |
| 5,409,528 A | 4/1995 | Walther et al. | |
| 5,438,034 A * | 8/1995 | Walker | 504/158 |
| 5,476,615 A | 12/1995 | Hall et al. | |
| 5,547,990 A | 8/1996 | Hall et al. | |
| 5,681,378 A * | 10/1997 | Kerherve | 106/14.15 |
| 5,972,862 A | 10/1999 | Torii et al. | |
| 6,080,789 A * | 6/2000 | Lutz | 514/642 |
| 6,297,285 B1 | 10/2001 | Lutz | |
| 6,372,410 B1 | 4/2002 | Ikemoto et al. | |
| 6,521,028 B1 | 2/2003 | Frenier | |
| 6,527,981 B1 | 3/2003 | Tseng et al. | |
| 7,842,127 B2 | 11/2010 | Malwitz | |
| 8,337,640 B2 * | 12/2012 | Bedard et al. | 148/240 |
| 2002/0165283 A1 | 11/2002 | Lutz | |
| 2003/0054193 A1* | 3/2003 | McCollum et al. | 428/626 |
| 2005/0003978 A1* | 1/2005 | Hall et al. | 510/175 |
| 2005/0012077 A1* | 1/2005 | Hall et al. | 252/392 |
| 2006/0151071 A1* | 7/2006 | Bedard et al. | 148/252 |
| 2006/0261312 A1 | 11/2006 | Hall et al. | |
| 2009/0004287 A1 | 1/2009 | Kimler et al. | |
| 2009/0203645 A1 | 8/2009 | Hall et al. | |
| 2009/0324820 A1 | 12/2009 | Chartier | |
| 2010/0087340 A1 | 4/2010 | Cassidy et al. | |

FOREIGN PATENT DOCUMENTS

| | | |
|---|---|---|
| EP | 0227179 A | 7/1987 |
| EP | 0284000 A | 9/1988 |
| EP | 0946788 B | 7/2001 |
| WO | WO 95/11324 A | 4/1995 |
| WO | WO 99/12889 | 3/1999 |
| WO | WO 02/092880 A | 11/2002 |
| WO | WO 03/006419 A1 | 1/2003 |
| WO | WO 2006/061230 A1 | 6/2006 |

\* cited by examiner

*Primary Examiner* — Joseph D Anthony
(74) *Attorney, Agent, or Firm* — Hoffmann & Baron, LLP

(57) ABSTRACT

Disclosed are quaternary ammonium salts containing non-halogen anions such as carbonates, bicarbonates, phosphates, glycolates and mixtures thereof as conversion coatings or additives imparting anti-corrosive properties to paints. The invention relates to a method for inhibiting the corrosion of metal surfaces by applying a composition containing one or more quaternary ammonium carbonate or bicarbonate. The disclosure is also directed to anti-corrosive coatings for metal substrates containing these compounds and to metal substrates having these anticorrosive coatings.

8 Claims, 4 Drawing Sheets

E-Coat Paint Peel Results

Salt Spray Failure of Spiked Latex Samples

Salt Spray Failure of Spiked Gloss Protective Spray Enamel Samples

QUATERNARY AMMONIUM SALTS AS A CONVERSION COATING OR COATING ENHANCEMENT

CROSS REFERENCE TO RELATED APPLICATION

This application is a divisional of U.S. application Ser. No. 12/952,690, filed on Nov. 23, 2010 and issued on Dec. 25, 2012 as U.S. Pat. No. 8,337,640, which is a continuation of U.S. application Ser. No. 11/299,323, filed on Dec. 9, 2005, which claims the benefit of U.S. Provisional Application No. 60/634,793, filed Dec. 9, 2004, all of which are hereby incorporated by reference in their entirety.

FIELD OF THE INVENTION

The present invention relates to the use of quaternary ammonium salts containing non-halogen anions such as carbonate, bicarbonate, phosphate and glycolate as active ingredients of conversion coatings and as additives for paints and coatings.

BACKGROUND OF THE INVENTION

In processes where metal surfaces come in contact with water, whether as liquid water or humid air, there is always the danger of corrosion. This is particularly problematic when the metal itself is prone to corrosion and is not coated.

Examples of metals prone to corrosion are found in stamped metal car parts made from ferrous alloys, abraded surfaces such as machined steel parts, and machine components made from cast iron.

Conversion coatings are used to inhibit corrosion and to assure good adhesion of paint to a metal surface, in particular to steel. Bare steel does not form a good bond with organic coatings. To improve the metal/organic coating bond, chromate or phosphate conversion coatings are chemically reacted with the steel to form a rough surface structure with metal-phosphate platelets that provide both mechanical and chemical keying (adhesion) of the organic polymer to the metal surface. See, for example, Watson, J. "A refresher: Understanding pretreatment", Powder Coating 1996, 7(3) and Ferguson, D.; Monzyk, B., "Nonpolluting replacement for chromate conversion coating and zinc phosphate in powder coating applications", Powder Coating 2001, 12(7). Here and hereinbelow, a conversion coating is to be understood to mean a protective barrier film or layer on the metal substrate surface simultaneously capable of both corrosion inhibition and paint adhesion and comprised of either (i) an organic film, (ii) an inorganic oxide resulting from a metal etching and redeposition process, (iii) an inorganic oxide resulting from a true deposition process, or (iv) any mixture of inorganic and organic materials from (i), (ii) and (iii). The most widely used conversion coatings are chromating, phosphochromating and zinc phosphatizing processes. It is believed that chromating gives better corrosion inhibition, while phosphochromating gives better paint adhesion. Prior to applying the conversion coating to the metal surface, the metal surface must be cleaned in order to remove any grease on the metal surface. The conversion coating can then be applied by either immersion or spraying. Chromate and phosphochromate conversion coatings are the most common chemical conversion coatings, but because of health, safety and environmental concerns other types of conversion coatings are needed.

SUMMARY OF THE INVENTION

It has been discovered that quaternary ammonium salts containing non-halogen anions such bicarbonate, carbonate, phosphate and glycolate, more specifically, dialkyl dimethyl ammonium salts containing bicarbonate, carbonate, phosphate or glycolate as the anion, and various combinations thereof, have applicability as a conversion coating for metal surfaces and steel in particular. Additionally it has been discovered that said quaternaries are capable of effecting a desirable surface transformation such as the growth of desirable surface oxides (i.e. magnetite, $Fe_3O_4$) on steel substrates. This oxide formation results in distinct crystallite domains which adhere to the metal substrate and to which coatings such as paints are expected to exhibit improved adhesion. In addition, said quaternary ammonium salts can be added directly to paints to provide better adhesion of the paint to the metal surface and thereby improving corrosion resistance.

The corrosion inhibition properties of quaternary ammonium carbonates and bicarbonates have been disclosed in copending U.S. patent application Ser. No. 10/810,279 (US 2005/0003978 A1). Additionally it has now been discovered that under the inhibitor film, a protected steel surface grows desirable surface oxides (i.e., magnetite, $Fe_3O_4$). This oxide formation creates domains to which organic coatings such as paints are expected to exhibit improved adhesion.

DETAILED DESCRIPTION OF THE INVENTION

Surprisingly, it has been found that certain quaternary ammonium salts containing non-halogen anions, such as di-n-decyldimethylammonium carbonate, when applied to the surface of iron and iron alloys such as steel, have a propensity to effect a known, desirable transformation on the surface of iron and iron alloys such as steel under much milder conditions of temperature than previously known. While thermally induced transformations of steel surfaces at >110° C. are known in the art, the high temperatures required to effect those transformations have heretofore limited their commercial exploitation. However the above mentioned quarternary ammonium salts appear capable of effecting a similar transformation of steel surfaces at temperatures as low as room temperature.

Additionally, the unique nature of the above quaternary ammonium salts (either neat or in formulation) allows for a one step metal surface preparation process prior to final coating applications. It has been found that metal exposure to their solutions will simultaneously clean, corrosion inhibit, and primer coat metal surfaces in preparation for final coating applications. This represents a significant improvement over current processes which perform the following independent functions in a stepwise fashion and with significantly greater amounts of industrial effluents which must be disposed of:
a) the raw metal is passivated with oil to prevent flash rust.
b) the passivation oil is removed and disposed of
c) the metal surface is treated with conversion coating solutions (acidic, heavy metal containing chemicals) and cured before the final coating is applied.

It has also been found that steel surfaces treated according to the present invention are resistant to flash rusting. Flash rusting occurs when a newly formed bare steel surface is exposed to water and reacts to form a red iron hydroxide rust layer.

Coiled sheet steel treated according to the present invention is resistant to the edge staining that occurs when moisture condenses on the edges of the coils. Presently steel sheet is sprayed with a light oil prior to storage or transportation. This oil must be removed prior to additional surface treatments or coatings.

The oxide film formed according to the present invention has the potential of being an under-paint conversion coating or primer for steel. Bare steel does not form a good bond with organic coatings. To improve the metal/organic coating bond, chromate or phosphate conversion coatings are chemically reacted with the steel to form a rough surface structure with metal-phosphate platelets that provide both mechanical and chemical keying (adhesion) of the organic polymer to the metal surface.

It has also been found that the conversion coatings and anticorrosive paints of the present invention exhibit certain self-healing properties on scratching, which means that even the "bare" metal surface in a scratch shows some passivation that may be due to migration of the quaternary ammonium salt from the surrounding coating. In some cases, a permanent oxide transformation is also observed resulting in long term passivation of a scratched area. This is an effect that is similar to the self-healing observed on chromium coated metal surfaces.

In particular, the present invention relates to a method for applying a conversion coating to the surface of a metal substrate, said method comprising the step of contacting the substrate with a composition comprising
(a) at least one quaternary ammonium salt containing a non-halogen anion and
(b) optionally, a solvent.

According to one preferred embodiment, the composition includes from about 0.05 to about 2% by weight and more preferably from about 0.1 to about 1% by weight of the quaternary ammounium salt(s) containing non-halogen anion(s), based upon 100% total weight of the composition.

Preferably, the quaternary ammonium salt has the formula

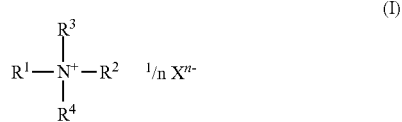

(I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated $C_{2-20}$ dicarboxylic acids, and anions of hydroxy-substituted carboxylic acids, and n denotes the appropriate number of negative charges of said anion.

Here and hereinbelow, $C_{1-20}$ alkyl groups are linear or branched alkyl groups having 1 to 20 carbon atoms, including, but not limited to, methyl, ethyl, propyl, isopropyl, butyl, isobutyl, sec-butyl, tert-butyl, pentyl, isopentyl, hexyl, heptyl, octyl, nonyl, isononyl, decyl, dodecyl, tetradecyl, hexadecyl, octadecyl and icosyl. Aryl-substituted $C_{1-20}$ alkyl groups are any of the above groups bearing an aryl group, in particular phenyl, as a substituent. Preferred examples of aryl-substituted $C_{1-20}$ alkyl groups are benzyl, phenylethyl and phenylpropyl.

The term "phosphates" is to be understood as including both acid and neutral salts of phosphoric acid, namely, dihydrogenphosphates ($H_2PO_4^-$), monohydrogenphosphates ($HPO_4^{2-}$) and phosphates ($PO_4^{3-}$), as well as salts of oligo- and polyphosphoric acids such as diphosphates (pyrophosphates) and triphosphates.

Phosphites are salts of phosphorous acids containing the anions $H_2PO_3^-$ and/or $HPO_3^{2-}$.

Sulfates are hydrogensulfate ($HSO_4^-$) and sulfate ($SO_4^{2-}$) as well as disulfate ($S_2O_7^{2-}$) and related anions.

Borates are any anions derived from boric acid ($H_3BO_3$) and the various polyboric acids.

Saturated and unsaturated acyclic $C_{1-20}$ monocarboxylic acids are in particular alkanoic acids, such as formic, acetic, propionic, butyric, pentanoic, hecanoic, octanoic, decanoic, dodecanoic, tetradecanoic, hexadecanoic, octadecanoic and icosanoic acids, or alkenoic acids, such as acrylic, methacrylic, oleic and linolic acid.

Saturated and unsaturated acyclic $C_{2-20}$ dicarboxylic acids are in particular alkanedioic acids, such as oxalic, malonic, succinic, glutaric and adipic acid, or alkenedioic acids such as fumaric or maleic acid.

Hydroxy-substituted carboxylic acids are any carboxylic acids bearing at least one hydroxy group in addition to the carboxylate group(s), such as glycolic, malic, citric or salicylic acid.

More preferred quaternary ammonium salts exhibiting the effect described above are quaternary ammonium carbonates, quaternary ammonium bicarbonates, quaternary ammonium phosphates and quaternary ammonium glycolates.

Still more preferably, $R^3$ and $R^4$ in the quaternary ammonium salt of formula I are methyl groups.

In a preferred embodiment, $R^1$ is methyl.

In a more preferred embodiment, $R^2$ is benzyl or phenylethyl.

In another preferred embodiment, $R^1$ and $R^2$ are the same $C_{1-20}$ alkyl groups.

In a more preferred embodiment, $R^1$ and $R^2$ are $C_{10}$ alkyl groups.

In an even more preferred embodiment, $R^1$ and $R^2$ are n-$C_{10}$ alkyl groups.

In a particularly preferred embodiment, the quaternary ammonium salt is di-n-decyldi-methylammonium carbonate and/or di-n-decyldimethylammonium bicarbonate.

Preferably, the metal substrate is steel.

More preferably, the steel is coiled sheet steel.

Another object of the invention is an article of manufacture comprising a metal substrate treated according to the above described method or any of its preferred embodiments.

Again, the preferred metal substrate is steel.

Still another object of the invention is an anticorrosive paint comprising
(a) at least one quaternary ammonium salt containing a non-halogen anion,
(b) a binder,
(c) optionally, a solvent and
(d) optionally, a pigment.

According to one preferred embodiment, the anticorrosive paint includes from about 0.05 to about 2% by weight and more preferably from about 0.1 to about 1% by weight of the quaternary ammounium salt(s) containing non-halogen anions, based upon 100% total weight of the paint.

As in the method described above, the quaternary ammonium salt in the anticorrosive paint preferably has the formula

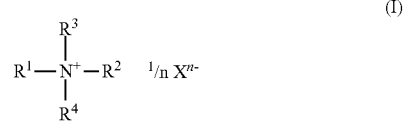

(I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, nitrate, sulfates, borates, anions of saturated and unsaturated acyclic $C_{1-20}$ monocarboxylic acids, anions of saturated and unsaturated $C_{2-12}$ dicarboxylic acids, and anions of hydroxy-substituted carboxylic acids, and n denotes the appropriate number of negative charges of said anion.

The further preferred embodiments of the quaternary ammonium salt in the above described method apply analogously to the anticorrosive paint.

Preferably, the binder is selected from the group consisting of acrylic resins, casein (milk protein), vinyl resins, latex resins, acetate resins, epoxy resins and mixtures thereof.

In a preferred embodiment, the anticorrosive paint is a latex paint.

In another preferred embodiment, the anticorrosive paint is an enamel spray paint.

In a further preferred embodiment, the anticorrosive paint is an E-Coating paint.

In still another preferred embodiment, the anticorrosive paint is an acrylic paint.

Still another object of the invention is an article of manufacture comprising a metal substrate painted with the above described anticorrosive paint. All preferred embodiments regarding the nature of the anticorrosive paint, the ammonium salt being comprised in said paint, and the metal substrate apply likewise to said article of manufacture.

Still another object of the invention is the use of a quaternary ammonium salt having the formula

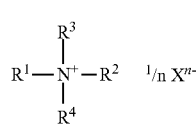

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated acyclic $C_{2-20}$ dicarboxylic acids and anions of hydroxy-substituted carboxylic acids, and n denotes the appropriate number of negative charges of said anion as an anticorrosive additive in paints or coatings.

The further preferred embodiments of the quaternary ammonium salt in the above described method apply analogously to the use as an anticorrosive additive.

Figure 1:
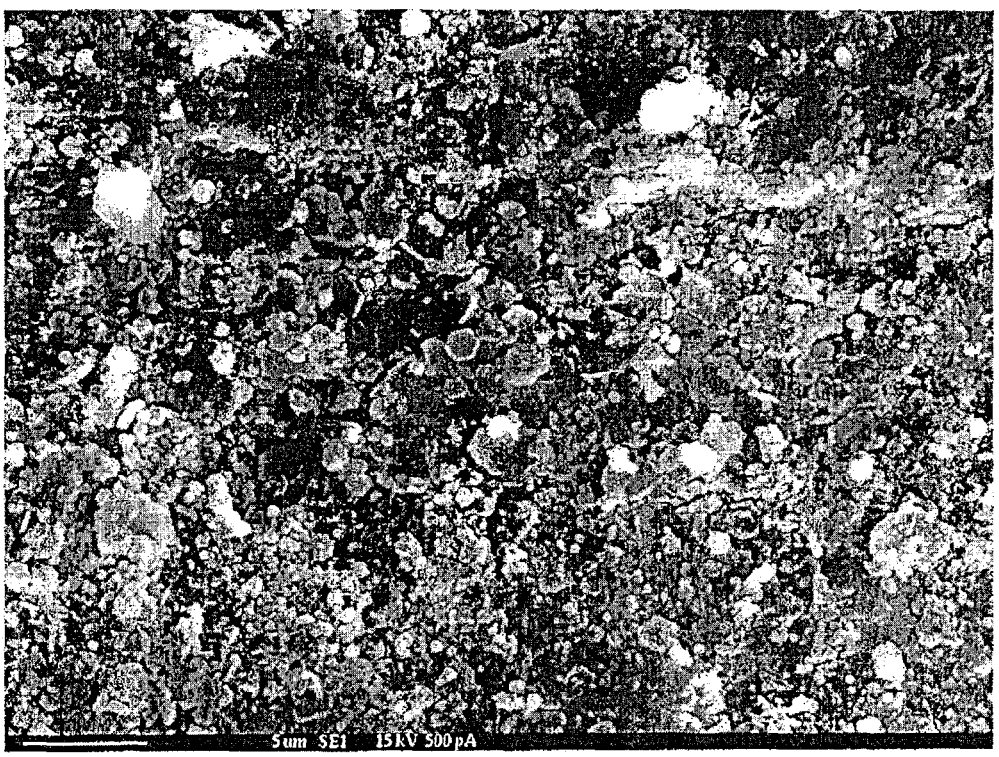
FIG. 1 is a SEM micrograph of a steel surface after two weeks immersion in 3.5% aqueous NaCl solution containing 0.1% di-n-decyldimethylammonium carbonate. Note the formation of hexagonal platelets on the surface.
Figure 2:
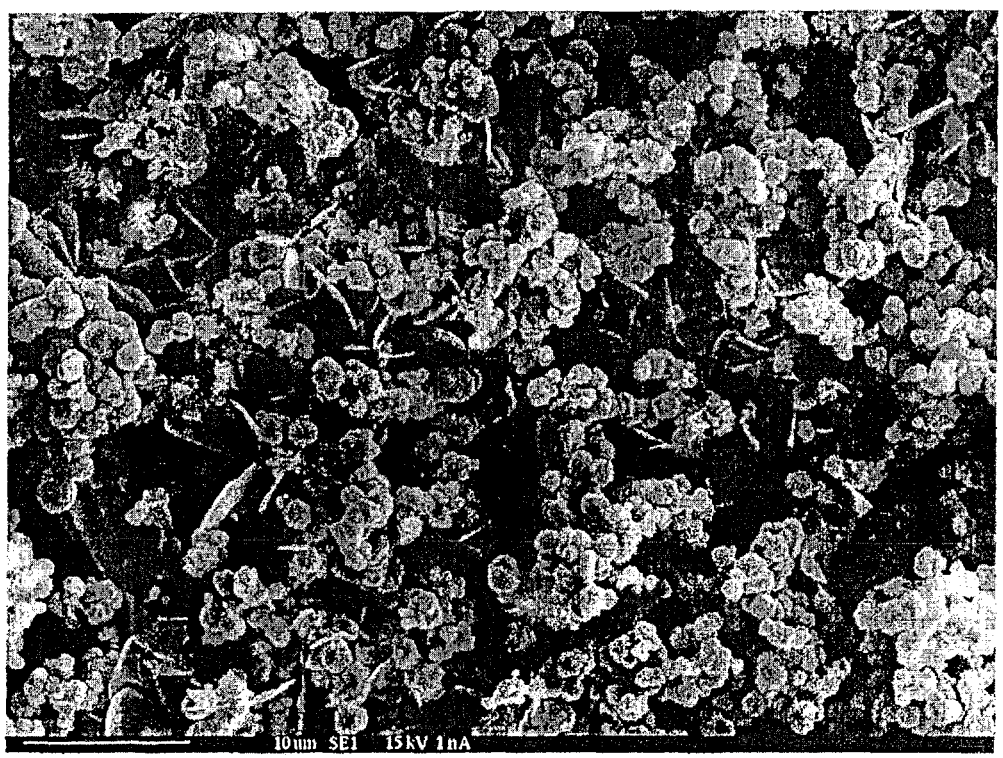
FIG. 2 is a SEM micrograph of a steel surface after two months immersion in 3.5% aqueous NaCl solution containing 0.1% di-n-decyldimethylammonium carbonate. The surface is covered with platelets and spherical particles. One of these phases is ferromagnetic (magnetite, $Fe_3O_4$).
Figure 3:
FIG. 3 is a SEM micrograph of a steel surface after 48 h immersion at 70° C. in a 0.1% solution of di-n-decyldimethylammonium glycolate in tap water.
Figure 4:
FIG. 4 is a SEM micrograph of a steel surface after 1 h immersion at 70° C. in tap water (control experiment).

The following examples illustrate the invention, but are not limiting thereof. All parts and percentages are given by weight unless otherwise stated.

Example 1

A Conversion Coating Study (Reference: N135751-001 through 018) was done with the objective to prepare steel panels (S-46, purchased from Q-Panel Lab Products, Cleveland, Ohio) with various aqueous treatments of either CarboShield® 1000 (di-n-decyldimethyl-ammonium bicarbonate/carbonate), "Phosphoquat" (di-n-decyldimethylammonium phosphates), and various related controls.

A plastic tank being 27.9 cm (11") in diameter and 27.9 cm (11") in height was used to treat the panels. The plastic tank was filled with 9,600 grams of test solution.

10.16 cm×15.24 cm×1.59 mm (4"×6"×1/16") steel (S-46) panels with a hole of 6.35 mm (1/4") in diameter located 6.35 mm (1/4') from the top edge were treated by placing a plastic pipette through the hole in the panel. Up to three panels were skewed using the same pipette. This allowed for the panels to stand upright, with only the bottom of the panel touching the bottom of the tank. The tank was then placed in an oven which was at 70° C. for one hour. After one hour, the panels were removed from the tank, dried with a paper towel and then wrapped in a plastic wrap and labeled. The test solutions prepared can be found in the list below. All concentrations are given in percents by weight. The concentrations stated for CarboShield® and Phosphoquat are the true concentrations of the active compound(s):

Test Solutions
Deionized Water
Tap Water (Allendale, N.J.)
5% Salt (NaCl) Water
0.1% CarboShield® 1000*⁾ in Deionized Water
  *⁾ Carbo Shield® 1000 is a 50% aqueous solution of di-n-decyldimethylammonium (bi)carbonate (90 mol % bicarbonate, 10 mol % carbonate).
0.1% CarboShield® 1000 in Tap Water (Allendale, N.J.)
0.1% CarboShield® 1000 in 5% Salt (NaCl) Water
0.1% Phosphoquat**⁾ (pH=2.5) in Deionized Water
  **⁾ Phosphoquat is a solution of di-n-decyldimethylammonium (hydrogen) phosphate(s) prepared by adding the amount of 85% aqueous phosphoric acid required to obtain the specified pH to CarboShield® 1000.
0.1% Phosphoquat (pH=4.0) in Deionized Water
0.1% Phosphoquat (pH=7.5) in Deionized Water
0.1% Glycoquat***⁾ (pH=7.5) in Deionized Water
  ***⁾ Glycoquat is a solution of di-n-decyldimethylammonium glycolate(s) prepared by adding the amount of glycolic acid required to obtain the specified pH to CarboShield® 1000.

After the steel panels were treated with the test solutions, they were painted using three different painting processes. Two panels were painted for each painting process. In one of the painting processes, the steel panels were spray painted using Rust-Oleum®'s Professional High Performance Enamel (Hunter Green) spray paint. Four steel panels were laid flat end to end and spray painted with approximately 18 g of paint applied to the top surface of the steel panels and allowed to dry overnight. The bottom of the panels were treated in a similar manner the next day. A second set of panels were painted using Rust-Oleum®'s Painters Touch® (Hunter Green) latex paint. The paint was applied with a foam roller to the steel panels. A total of two coats of paint were applied to each side of the steel panels. A third set of panels were painted using a commercial painting process known as E-Coating (a polymer based coating). These samples were painted at Royal E-Coat (Costa Mesa, Calif.), using a proprietary process. A fourth set of steel panels (untreated) were also painted using Rust-Oleum®'s Painters Touch® (Hunter Green) latex paint to which CarboShield® 1000 was added at either 0.1%, 0.5% or 1.0%. A fifth set of steel panels (untreated) were also painted using Rust-Oleum®s Gloss Protective Spray Enamel (Hunter Green) paint to which CarboShield® 1000, phosphoquat, or glycoquat was added at indicated levels.

All of the painted samples were sent to Assured Testing Services (224 River Rd., Ridgeway, Pa. 15853) for salt spray testing (ASTM B117). One set of panels were scored with an "X" in the center of the panel. The amount of paint pull back for the scored X was measured (in mm) in 5 different locations. The measurements were then averaged. The lower the average value, the better was the performance of the treatment. The samples were measured at different time intervals during the course of the testing. The second set was edge coated with wax to prevent edge effects. The undisturbed panel surface was periodically evaluated for total visible rust and rated from 0 to 100%.

Conversion Coating/Paint/Salt Spray Testing Results:
The panels that were spray painted (enamel) exhibited the largest improvement in paint adhesion relative to the control samples. For most of the test samples evaluated, the latex paint samples did not show differences between test sample and the corresponding controls. The E-Coat samples exhibited the least amount of paint pull back after 144 hours. The relevant results where differences exist between the test sample and the control are compiled in Tables 1 and 2 below.

TABLE 1

| Type of Water Used | Additive Treatment | Paint Type | Rating* (after 144 hours) (Amount of Paint Pull Back) |
|---|---|---|---|
| 5% Salt Water | CarboShield ® 1000 | Enamel Spray Paint | 7.36 |
| 5% Salt Water | None | Enamel Spray Paint | 12.36 (Control) |
| None | None | Enamel Spray Paint | 13.89 (Control) |
| Deionized Water | Phosphoquat (pH = 7.5) | Enamel Spray Paint | 5.71 |
| Deionized Water | CarboShield ® 1000 | Enamel Spray Paint | 7.63 |
| Deionized Water | Phosphoric Acid (pH = 4.0) | Enamel Spray Paint | 8.86 |
| Deionized Water | Phosphoquat (pH = 2.5) | Enamel Spray Paint | 9.87 |
| Deionized Water | Phosphoquat (pH = 4.0) | Enamel Spray Paint | 9.98 |
| None | None | Enamel Spray Paint | 13.89 (Control) |
| Deionized Water | None | Enamel Spray Paint | 15.20 (Control) |
| Tap Water | CarboShield ® 1000 | Enamel Spray Paint | 10.04 |
| Tap Water | None | Enamel Spray Paint | 11.86 (Control) |
| None | None | Enamel Spray Paint | 13.89 (Control) |
| Tap Water | CarboShield ® 1000 | Latex Paint | 7.65 |
| Tap Water | None | Latex Paint | 9.10 (Control) |
| Tap Water | None | Latex Paint | 9.12 (Control) |
| Deionized Water | Phosphoquat (pH = 2.5) | Latex Paint | 5.95 |
| Deionized Water | None | Latex Paint | 6.87 (Control) |

*) Average paint peel in mm.

This data clearly demonstrates dramatic improvements to paint peel in the case of a commercial spray enamel when the test panel is pre-treated with CarboShield® 1000 and phosphoquat materials.

TABLE 2

Summary of average paint peel back data for E-coated samples.

| Sample ID | Description | Salt Spray Hours | | | |
|---|---|---|---|---|---|
| | | 48 | 144 | 384 | 552 |
| B10 | Ecoat control, salt | 0.97 | 3.31 | 6.22 | 7.32 |
| A10 | Ecoat, control, untreated | 1.15 | 2.42 | 4.61 | 7.24 |
| E32 | Phosphoric Acid, control | 0.79 | 2.49 | 5.57 | 6.22 |
| B16 | CS1000, Ecoat | 1.65 | 2.71 | 5.74 | 7.11 |
| F8 | Ecoat MP10 | 1.12 | 2.43 | 3.85 | 5.76 |
| D16 | Ecoat CS 1000 | 1.07 | 3.04 | 5.53 | 5.59 |
| E14 | PQ2.5 Ecoat | 1.10 | 2.36 | 4.40 | 5.46 |
| E16 | PQ4.0 Ecoat | 1.53 | 3.07 | 4.15 | 4.93 |
| E18 | PQ7.5, Ecoat | 1.12 | 2.00 | 2.76 | 3.09 |

PQ = Phosphoquat;
CS = CarboShield ®;
DI = deionized water.

Figure 5:
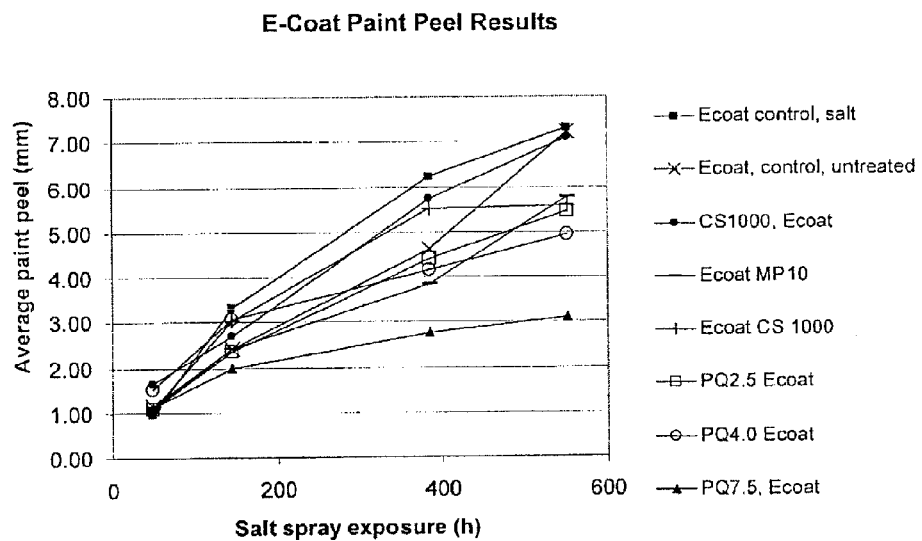
FIG. 5 depicts the results of paint peel back tests with several E-coated steel samples after salt spray exposure.

The results listed in Table 2 are also depicted in FIG. 5.

A duplicate set of unscored paint panels was prepared and subjected to salt spray exposure testing. Table 3 below is a summary table of the key results where differences exist between the test sample and the control.

TABLE 3

Summary of key undisturbed test panel surfaces salt spray testing

| Water Used | Additive Treatment | Paint Type | % Visual Rust | Time (h) |
|---|---|---|---|---|
| Deionized Water | Phosphoquat (pH = 2.5) | Latex | 20% | 288 |
| Deionized Water | Phosphoquat (pH = 4.0) | Latex | 20% | 288 |
| Deionized Water | Phosphoquat (pH = 7.5) | Latex | 40% | 288 |
| Deionized Water | Phosphoric acid (pH = 4.0) | Latex | 10% (Control) | 288 |
| Deionized Water | None | Latex | 75% (Control) | 288 |
| 5% Salt Water | CarboShield ® 1000 | Enamel Spray | 20% | 288 |
| 5% Salt Water | None | Enamel Spray | 75% (Control) | 288 |
| Deionized Water | Phosphoquat (pH = 2.5) | Enamel Spray | 10 | 456 |
| Deionized Water | CS MP10 | Enamel Spray | 15 | 456 |
| Deinonized Water | CarboShield ® 1000 | Enamel Spray | 15 | 456 |
| Deionized Water | Phosphoquat (pH = 4.0) | Enamel Spray | 40 | 456 |
| Deionized Water | Phosphoric acid (pH = 4.0) | Enamel Spray | 40% (Control) | 456 |
| Deionized Water | None | Enamel Spray | 40 | 456 |
| Deionized Water | Phosphoquat (pH = 7.5) | Enamel Spray | 50 | 456 |
| Tap Water | CarboShield ® 1000 | Enamel Spray | 5 | 624 |
| Tap Water | None | Enamel Spray | 15 | 624 |

Collectively, this data demonstrates a dramatic ability of both CarboShield® 1000 and the phosphoquat version "conversion coating" pretreatments to significantly reduce total rust of a commercial latex and a spray enamel treatment in salt spray testing.

TABLE 4

Peel back data for CarboShield ® 1000 added to brush latex

| "Spiking" Treatment | Peel Rating (144 h) |
|---|---|
| 1.0% CarboShield ® in Latex Paint | 3.79 |
| 0.1% CarboShield ® in Latex Paint | 5.97 |
| 0.5% CarboShield ® in Latex Paint | 6.98 |
| 0.0% CarboShield ® in Latex Paint | 9.12 |

This data shows dramatic improvements in paint peel when CarboShield® 1000 is incorporated directly into a commercial paint formulation.

Figure 6:
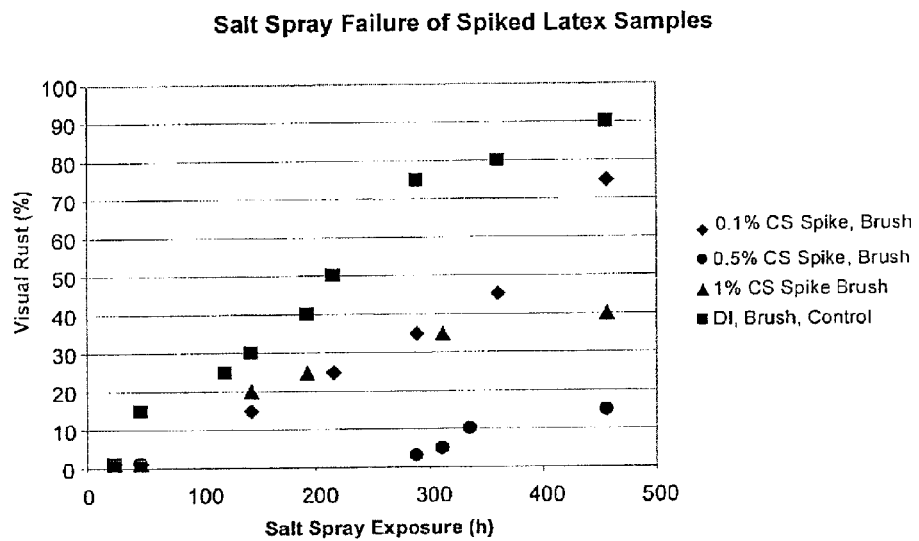
FIG. 6 depicts the results of salt spray tests of steel samples painted with latex paint made anticorrosive by addition of quaternary ammonium salts.

In another test, the amount of visual rust (in %) was determined for undisturbed test panel surfaces painted with latex paint spiked with various amounts of CarboShield® 1000 (CS) after salt spray exposure for 24 to 456 h. The data is compiled in Table 5 below and depicted in FIG. 6.

TABLE 5

Undisturbed test panel surfaces for latex paint spiked with CarboShield ® 1000.

| Time (h) | Sample G1 0.1% CS Spike, Brush | Sample G3 0.5% CS Spike | Sample G5 1% CS Spike | Sample A5 Brushed, Untreated |
|---|---|---|---|---|
| 24 | 1 | 1 | 1 | 1 |
| 48 | 1 | 1 | 1 | 1 |
| 120 | | | | 20 |
| 144 | 15 | | 20 | 30 |
| 192 | | | 25 | |
| 216 | 25 | | | 45 |
| 288 | 35 | 3 | | 80 |
| 312 | | 5 | 35 | |
| 336 | | 10 | | |
| 360 | 45 | | | 85 |
| 456 | 75 | 15 | 40 | 95 |

Samples were prepared by brush application.

Figure 7:
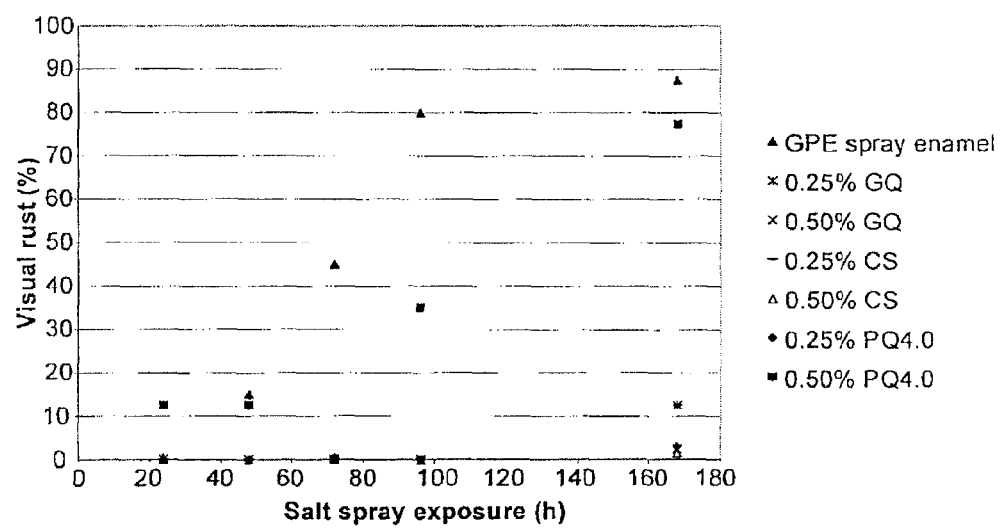
FIG. 7 depicts the results of salt spray tests of steel samples painted with gloss protective spray enamel with various amounts of quaternary ammonium salts.

In another test, the amount of visual rust (in %) was determined for undisturbed test panel surfaces painted with gloss protective spray enamel with various amounts of CarboShield® 1000 (CS), phosphoquat, and glycoquat after salt spray exposure for 24 to 168 h. The data is compiled in Table 6 below and depicted in FIG. 7.

TABLE 6

Undisturbed test panel surfaces for gloss protective spray enamel (GPE) spiked with CarboShield ® 1000 (CS), phosphoquat (PQ), and glycoquat (GQ).

| | Time (h) | | | | |
|---|---|---|---|---|---|
| Sample Description | 24 | 48 | 72 | 96 | 168 |
| GPE spray enamel (control) | 0.5 | 15 | 45 | 80 | 87.5 |
| 0.25% GQ (spiked) | 0 | 0 | 0 | 0 | 12.5 |
| 0.50% GQ (spiked) | 0 | 0 | 0 | 0 | 2.5 |
| 0.25% CS (spiked) | 0 | 0 | 0 | 0.5 | 12.5 |
| 0.50% CS (spiked) | 0 | 0 | 0 | 0 | 1.5 |
| 0.25% PQ4.0 (spiked) | 0 | 0 | 0.5 | 0 | 3 |
| 0.50% PQ4.0 (spiked) | 12.5 | 12.5 | 0 | 35 | 77.5 |

All samples were prepared by brush application in order to allow for spiking where applicable.

The data in tables 5 & 6 shows dramatic improvements in corrosion resistance when CarboShield® 1000 or related phosphoquat or glycoquat materials are incorporated directly into commercial paint formulations.

Example 2 & Comparative Example 1

Two latex paints were formulated according to the amounts and order of ingredients and process steps listed in Table 7. One formulation (Example 2) contained CarboShield® 1000 while the other one (Comparative Example 1) contained a combination of a nonionic surfactant (Triton X-100) and a conventional corrosion inhibitor (Canguard® 327).

TABLE 7

Summary of Formulated Ingredients

| Material/Process Step | Comp. Example 1 | Example 2 |
|---|---|---|
| Water | 57.34 L | 57.34 L |
| Propylene glycol | 15.42 kg | 15.42 kg |
| Natrosol ® 250 HBR | 816.5 g | 816.5 g |
| Mix 30 minutes | | |
| Tamol ® 850 | 4.536 kg | 4.536 kg |
| Triton ® X-100 | 1.043 kg | — |
| CarboShield ® 1000 | — | 1.043 kg |
| Drewplus ® L-493 | 861.8 g | 861.8 g |
| Canguard ® 327 | 1.021 kg | — |
| AMP-95 ™ | 453.6 g | 453.6 g |
| Mix | | |
| Ti-Pure ® R-931 | 87.32 kg | 87.32 kg |
| Imsil ® A-15 | 87.32 kg | 87.32 kg |
| High speed stir at 4,000 RPM for 30 min, then decrease speed to 1,000 RPM | | |
| UCAR ® 123 latex | 154.0 kg | 154.0 kg |
| Texanol ® | 3.080 kg | 3.080 kg |
| Drewplus ® L-493 | 997.9 g | 997.9 g |
| Acrosol ® RM-825 | 907.2 g | 907.2 g |
| Water | 81.29 L | 81.29 L |
| Allow to sit for 48 hours to test for stability and dispersion before testing material | | |

Natrosol ® 250 HBR is a water soluble hydroxyethylcellulose of Hercules Inc., Wilmington, Delaware.
Tamol ® 850 is a sodium polyacrylate of Rohm and Haas Co., Philadelphia, Pennsylvania.
Triton ® X-100 is an octylphenol ethoxylate of The Dow Chemical Company.
Drewplus ® L-493 is a defoamer of Ashland Specialty Chemical Co., Boonton, New Jersey.
Canguard ® 327 is an oxazolidine-based corrosion inhibitor of ANGUS Chemical Company, a subsidiary of The Dow Chemical Company.
AMP-95 ™ is 2-amino-2-methyl-1-propanol containing 5% water, obtainable from ANGUS Chemical Company.
Ti-Pure ® R-931 is a rutile titanium dioxide pigment of DuPont Titanium Technologies, Wilmington, Delaware.
Imsil ® A-15 is a microcrystalline silica of Unimin Specialty Minerals Inc., Tamms, Illinois.
UCAR ® 123 is a high-solids styrene-acrylic binder of UCAR Emulsion Systems, Cary, North Carolina.
Texanol ® is 2,2,4-trimethyl-1,3-pentanediol monoisobutyrate of Eastman Chemical Company, Kingsport, Tennessee.
Acrosol ® RM-825 is an acrylate copolymer-based rheology modifier of BASF AG, Ludwigshafen, Germany.

The formulations of Table 7 were tested for storage stability and viscosity as well as scrub resistance and hide of paint films on metal surfaces.

The formulation of Example 2 was stable for several days, even better than that of Comparative Example 1, with less separation. The formulation was also "creamier" (more desirable) than the comparative formulation. This observation confirms that CarboShield® 1000 is compatible in latex systems.

Hide, which is the ability of a coating to hide black marks, was 96.8% in the comparative example 97.2% in the example according to the invention. This indicates that CarboShield® 1000 works better than the surfactant Triton® X-100. Hide was measured by contrast ratio using a bird bar draw down (76.2 μm=3 mil) on a standard Leneta (type 2C) card and are expressed as a ratio of black and white L-values (LAB color system).

The scrub resistance of the paint film prepared from the formulation of Example 2 was 480 cycles to failure while that of the film prepared from the formulation of Comparative Example 1 was only 370 cycles to failure. This is a significant ca. 30% improvement. Scrub resistance was measured using standard ASTM D2486 methodology.

Gloss measurements indicated no significant difference between the coatings prepared from both formulations.

The Stormer viscosity of the Formulation of Example 2 was significantly higher than that of Comparative Example 1, 83 KU vs. 73 KU. This allows to reduce the amount of associative thickener added to the formulation.

All patents and publications cited herein are incorporated by reference in their entirety to the same extent as if each was individually incorporated by reference.

The invention claimed is:

1. An anticorrosive paint comprising
   (a) at least one quaternary ammonium salt containing a non-halogen anion, wherein the quaternary ammonium salt has the formula

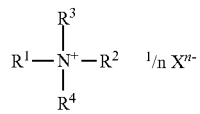
(I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated acyclic $C_{2-20}$ dicarboxylic acids and anions of hydroxy-substituted carboxylic acids, and n denotes the appropriate number of negative charges of said anion;
   (b) a binder,
   (c) optionally, a solvent and
   (d) optionally, a pigment.

2. The anticorrosive paint of claim 1, wherein the binder is selected from the group consisting of acrylic resins, casein (milk protein), vinyl resins, latex resins, acetate resins, epoxy resins and mixtures thereof.

3. The anticorrosive paint of claim 1, which is a latex paint.

4. The anticorrosive paint of claim 1, which is an enamel spray paint.

5. The anticorrosive paint of claim 1, which is an e-coating paint.

6. The anticorrosive paint of claim 1, which is an acrylic paint.

7. An article of manufacture comprising a metal substrate painted with the anticorrosive paint of any of claim 1.

8. A method of preparing an anticorrosive paint or coating comprising adding to the paint or coating a quaternary ammonium salt having the formula

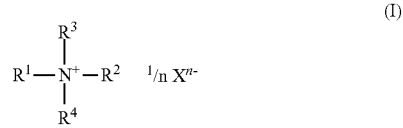
(I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated acyclic $C_{2-20}$ dicarboxylic acids and anions of hydroxy-substituted carboxylic acids, and n denotes the appropriate number of negative charges of said anion.

* * * * *